(12) United States Patent
Tang et al.

(10) Patent No.: US 9,030,815 B2
(45) Date of Patent: May 12, 2015

(54) COMPUTER ENCLOSURE AND FAN MOUNTING APPARATUS

(71) Applicants: Xian-Xiu Tang, Shenzhen (CN); Ning Li, Shenzhen (CN); Chia-Shin Chou, New Taipei (TW)

(72) Inventors: Xian-Xiu Tang, Shenzhen (CN); Ning Li, Shenzhen (CN); Chia-Shin Chou, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 379 days.

(21) Appl. No.: 13/664,638

(22) Filed: Oct. 31, 2012

(65) Prior Publication Data

US 2014/0078670 A1 Mar. 20, 2014

(30) Foreign Application Priority Data

Sep. 19, 2012 (CN) .......................... 2012 1 03475681

(51) Int. Cl.
*G06F 1/16* (2006.01)
*G06F 1/18* (2006.01)
*G06F 1/20* (2006.01)

(52) U.S. Cl.
CPC . *G06F 1/183* (2013.01); *G06F 1/20* (2013.01)

(58) Field of Classification Search
USPC ...................................... 361/679.48
See application file for complete search history.

(56) References Cited

U.S. PATENT DOCUMENTS 7,492,592 B2 * 2/2009 Ye et al. ......................... 361/695
7,948,755 B1 * 5/2011 Guan ............................. 361/695
8,120,911 B2 * 2/2012 Zhou et al. ..................... 361/695

* cited by examiner

*Primary Examiner* — Anthony Q Edwards
(74) *Attorney, Agent, or Firm* — Novak Druce Connolly Bove + Quigg LLP

(57) ABSTRACT

A computer enclosure includes a sidewall and a fan mounting apparatus. The sidewall defines a ventilation area and four slide slots around the ventilation area. The fan mounting apparatus includes two opposite first position member, and two opposite second position members alternately arranged with the first position members. The first and second position members are slidably connected end to end and cooperatively define a ring. The first and second position plates are moved toward or away from each other. The first and second position members are slidably and respectively connected to the slide slots, to decrease or increase a diameter of the ring for selectively mounting different sized fans.

14 Claims, 8 Drawing Sheets

COMPUTER ENCLOSURE AND FAN MOUNTING APPARATUS

BACKGROUND

1. Technical Field

The present disclosure relates to computer enclosures and, particularly, to a computer enclosure including a fan mounting apparatus for mounting a fan on the computer enclosure.

2. Description of Related Art

A system fan is typically secured to a sidewall of a computer enclosure by screws engaging in mounting holes around a ventilation area of the sidewall, to dissipate heat so as to assure electrical components in the computer enclosure operating within a desired temperature range.

When the electrical components are changed, a different sized fan may be required. However, it is hard to attach the new fan to the sidewall by screws engaging in the original mounting holes.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
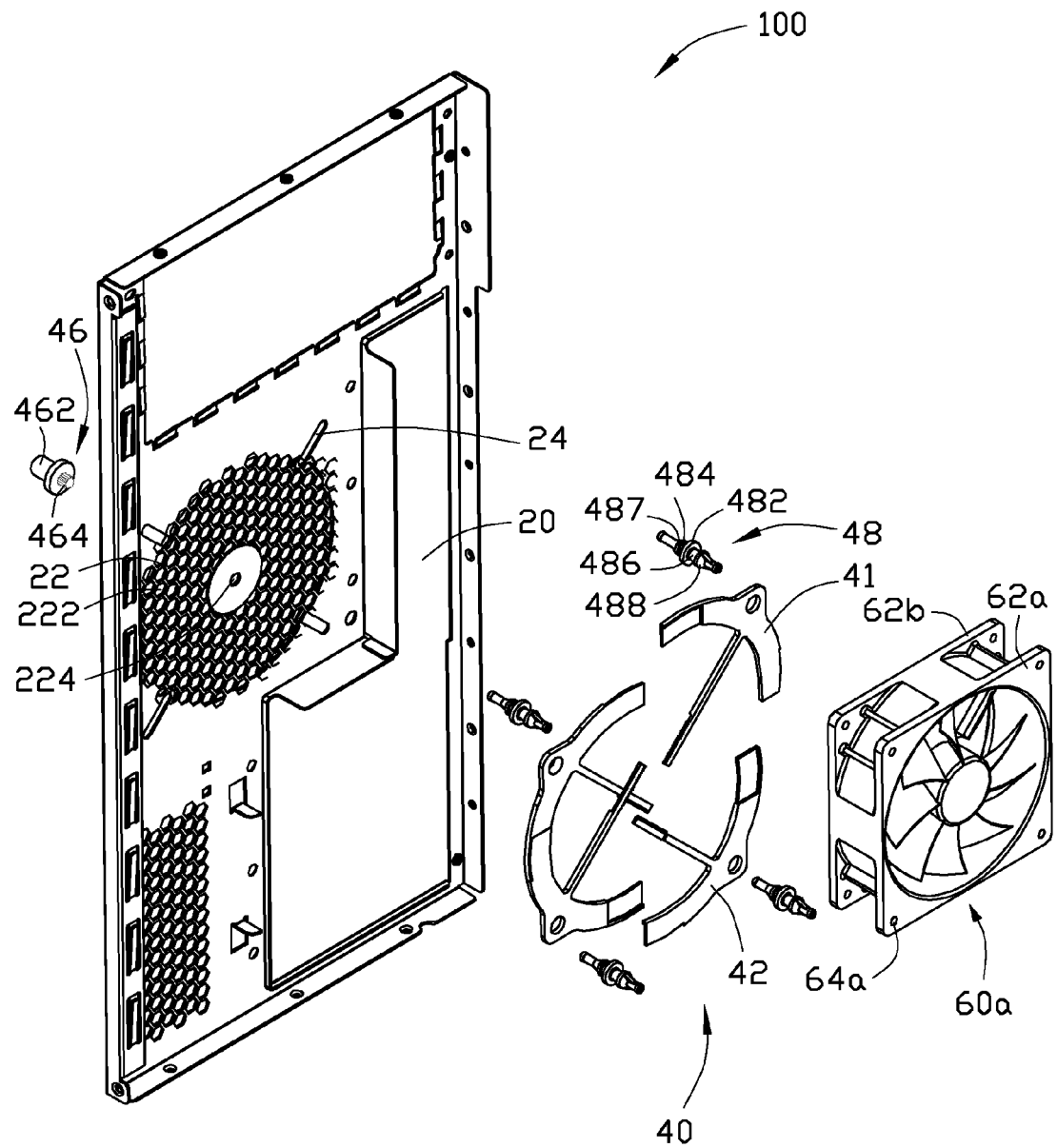
FIG. 1 is an exploded, isometric view of an embodiment of a computer enclosure, wherein the computer enclosure includes a sidewall, two first position members, two second position members, four fastening members, and a first fan.

FIG. 1 shows an embodiment of a computer enclosure 100. The computer enclosure 100 is capable of receiving fans of different sizes, such as a 120 millimeter (mm) first fan 60a, and a 90 mm second fan 60b (shown in FIGS. 6 and 7). The first fan 60a and the second fan 60b each include two rectangular side plates 62a and 62b. Four corners of each of the side plates 62a and 62b define four through holes 64a. The computer enclosure 100 includes a sidewall 20 and a fan mounting apparatus 40.

The sidewall 20 defines a circular ventilation area 22 and four slide slots 24 around the ventilation area 22. The ventilation area 22 defines a plurality of ventilation holes 222. A center of the ventilation area 22 defines a rotation hole 224. The slide slots 24 are evenly located around the ventilation area 22, and each slide slot 24 radially extends about the rotation hole 224.

The fan mounting apparatus 40 includes two first position members 41, two second position members 42, an operation member 46, and four fastening members 48.

Figure 2:
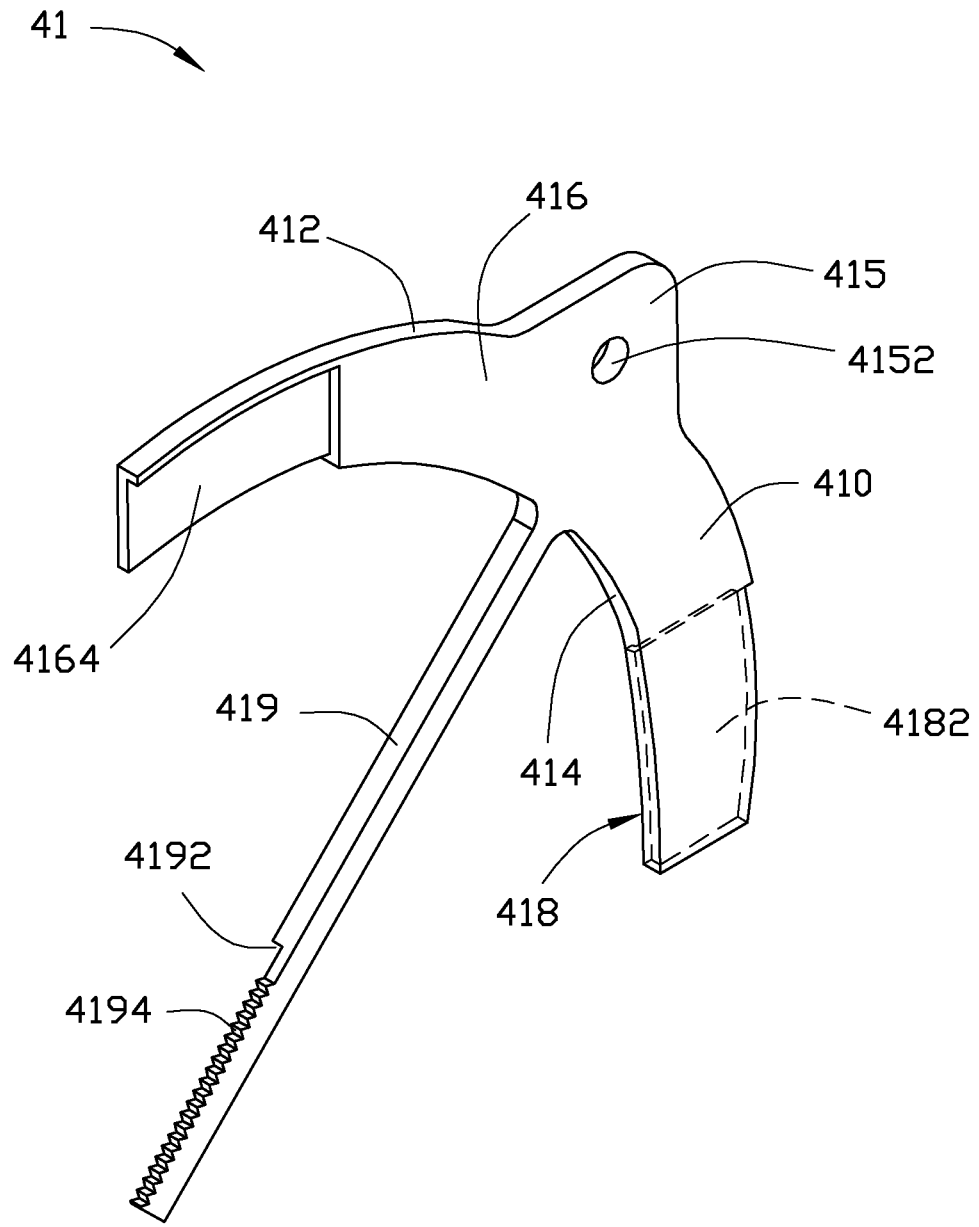
FIG. 2 is an enlarged view of one of the first position members of FIG. 1.

FIG. 2 shows each first position member 41 of the embodiment. Each first position member 41 includes an arc-shaped position plate 410, a tab 415 radially extending out from a center of a convex side 412 of the position plate 410. In addition, a connecting pole 419 radially extending in from a center of a concave side 414 of the position plate 410 opposite to the convex side 412. The position plate 410 includes a first surface 416 and a second surface 418 opposite to the first surface 416, and the first surface 416 and the second surface 418 are connected between the convex side 412 and the concave side 414. The tab 415 defines a through hole 4152. A first end of the position plate 410 forms a recessed first connecting portion 4164 in the first surface 416 and extending through the concave side 414. A second end of the position plate 410 opposite to the first end forms a recessed second connecting portion 4182 in the second surface 418 and extending through the convex side 412. A distal end of the connecting pole 419 defines a cutout 4192 at the same side with the second surface 418. A side of the distal end of the connecting pole 419 facing the first connecting portion 4164 forms a rack 4194, extending along the lengthwise direction of the connecting pole 419.

Figure 3:
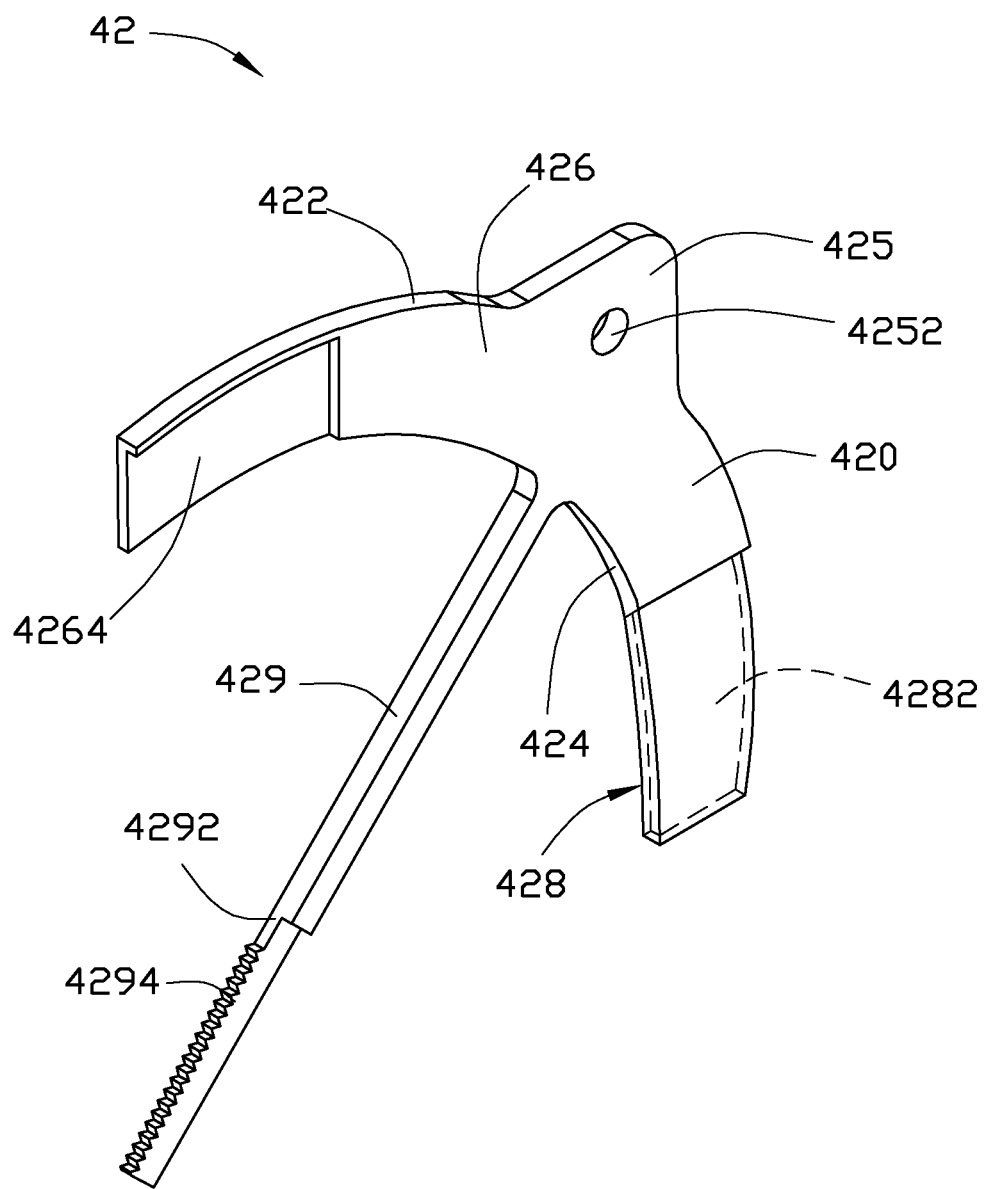
FIG. 3 is an enlarged view of one of the second position members of FIG. 1, but viewed from another perspective.

FIG. 3 shows each second position member 42 is similar to the first position member 41 in shape. Each second position member 42 includes an arc-shaped position plate 420, a tab 425 radially extending out from a center of a convex side 422 of the position plate 420, and a connecting pole 429 radially extending in from a center of a concave side 424 of the position plate 420 opposite to the convex side 422. The position plate 420 includes a first surface 426 and a second surface 428, opposite to the first surface 426. The first surface 426 and the second surface 428 are connected between the convex side 422 and the concave side 424. The tab 425 defines a through hole 4252. A first end of the position plate 420 forms a recessed third connecting portion 4264 in the first surface 426 and extending through the concave side 424. A second end of the position plate 420, opposite to the first end, forms a recessed fourth connecting portion 4282 in the second surface 428 and extending through the convex side 422. A distal end of the connecting pole 429 defines a cutout 4292 at the same side with the first surface 426. A side of the distal end of the connecting pole 429 facing the third connecting portion 4264 forms a rack 4294 extending along the lengthwise direction of the connecting pole 429.

The operation member 46 includes a columnar operation portion 462 and a gear 464 protruding out from an end of the operation portion 462.

Figure 4:
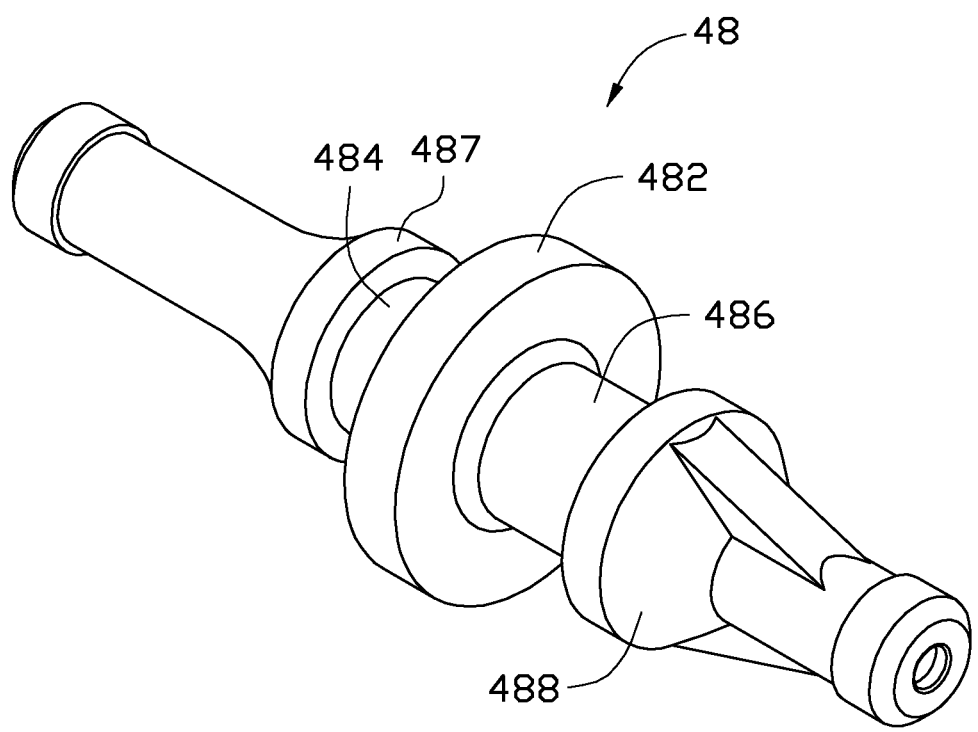
FIG. 4 is an enlarged view of one of the fastening members of FIG. 1.

FIG. 4 shows each fastening member 48 of the embodiment. Each fastening member 48 includes a circular abutting plate 482 and a first neck portion 484, extending out from a first surface of the abutting plate 482. A second neck portion 486 extends out from a second surface of the abutting plate 482, opposite to the first neck portion 484. A tapered resilient first pin 487 protrudes out from a distal end of the first neck portion 484, opposite to the abutting plate 482, and a tapered resilient second pin 488 protrudes out from a distal end of the second neck portion 486, opposite to the abutting plate 482. A diameter of the first pin 487 adjacent to the first neck portion 484 is greater than a diameter of the first neck portion 484. A diameter of the second pin 488, adjacent to the second neck portion 486, is greater than a diameter of the second neck portion 486.

Figure 5:
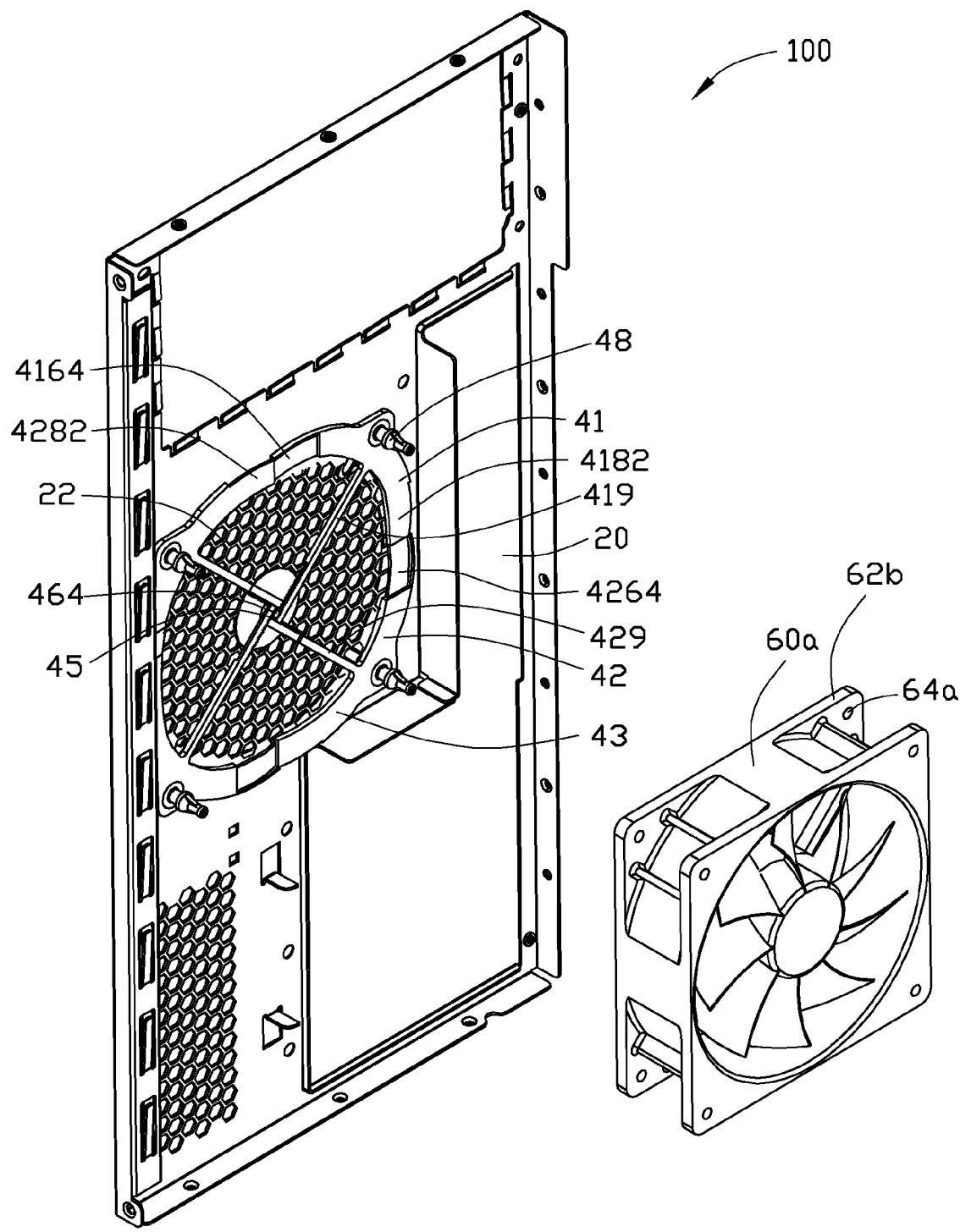
FIG. 5 is a partially assembled, isometric view of FIG. 1.

FIG. 5 shows that in assembly of the fan mounting apparatus 40. The first position members 41 and the second position members 42 are slidably connected end to end. The first connecting portion 4164 and the second connecting portion 4182, of each first position member 41, are slidably latched to the fourth connecting portion 4282 of one of the second position member 42 and the third connecting portion 4264 of the other second position member 42, respectively. The first position members 41 and the second position members 42 cooperatively define a ring 43. The ring 43 is operable to change in diameter. The distal ends of the connecting poles 419 of the first position members 41 and the connecting poles 429 of the second position members 42 cooperatively define a rectangular receiving space 45 communicating with the rotation hole 224. The racks 4194 and 4294 of the first and second position members 41 and 42 face the receiving space 45.

The fastening members 48 are respectively inserted into the through holes 4152 and 4252 of the first and second position members 41 and 42. The second pin 488 of each fastening member 48 is deformed to pass through a corresponding one of the through holes 4152 and 4252. The second neck portion 486 is received in the corresponding one of the through holes 4152 and 4252. The abutting plate 482 abuts a first surface of the ring 43 facing an inner surface of the sidewall 20. Therefore, the fastening members 48 are attached to the ring 43. The first pins 487 of the fastening members 48 are deformed to be inserted into the respective slide slots 24 from the inner surface of the sidewall 20, until the first pins 487 pass through the slide slots 24. Thus, the first neck portions 484 are slidably received in the slide slots 24. The first pins 487 adjacent to the first neck portions 484 are restored and abut an outer surface of the sidewall 20 opposite to the ring 43. Therefore, the fastening members 48 are slidably latched in the corresponding slide slots 24. The ring 43 aligns with the ventilation area 22 of the sidewall 20.

The gear 464 of the operation member 46 is inserted into the rotation hole 224 from the outer surface of the sidewall 20. The gear 464 is received in the receiving space 45 and is meshed with the racks 4194 and 4294. The operation portion 462 of the operation member 46 is rotated to rotate the gear 464. The gear 464 moves the racks 4194 and 4294. The connecting poles 419 of the first position members 41 are moved toward or away from each other, the connecting poles 429 of the second position members 42 are moved toward or away from each other, and the fastening members 48 slid along the corresponding slide slots 24, to decrease or increase the diameter of the ring 43.

Figure 6:
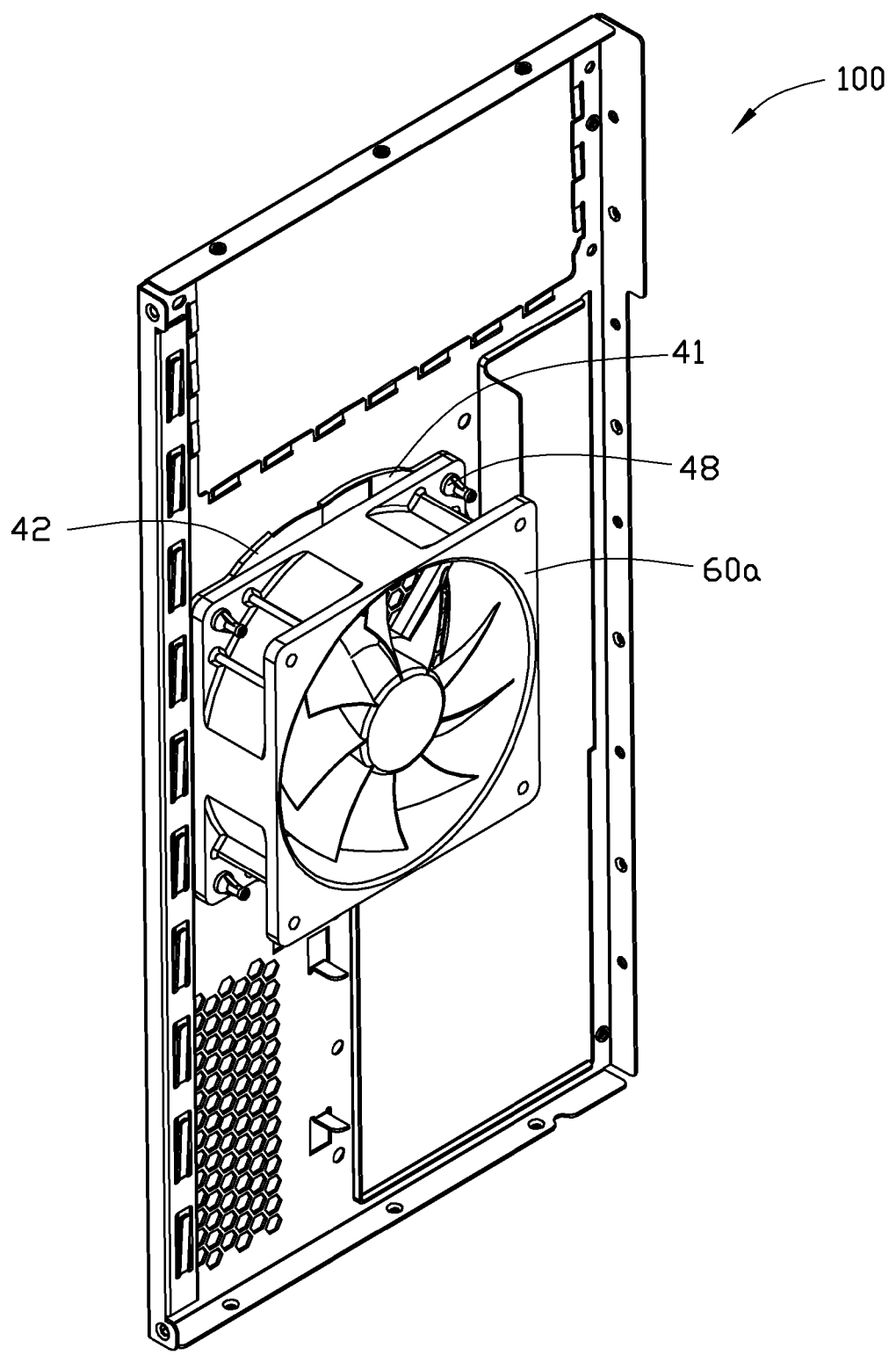
FIG. 6 is assembled, isometric view of FIG. 1.

FIG. 6 shows that in assembly of the first fan 60a to the fan mounting apparatus 40, the through holes 64a of the first fan 60a are respectively aligned with the second pins 488 of the fastening members 48. The first fan 60a is moved toward the sidewall 20. The second pins 488 of the fastening members 48 are respectively inserted into the through holes 64a of the second plate 62a under deformation force of the second pins 488, until the second pins 488 pass through the through holes 64a of the second plate 62a. The second neck portions 486 are respectively extended through the through holes 64a of the second plate 62a. The second pins 488 are restored to abut an inner surface of the side plate 62a. The first position members 41 and the second position members 42 cooperatively block portions of the ventilation area 22 around the first fan 60a, for preventing turbulent airflow.

Figure 7:
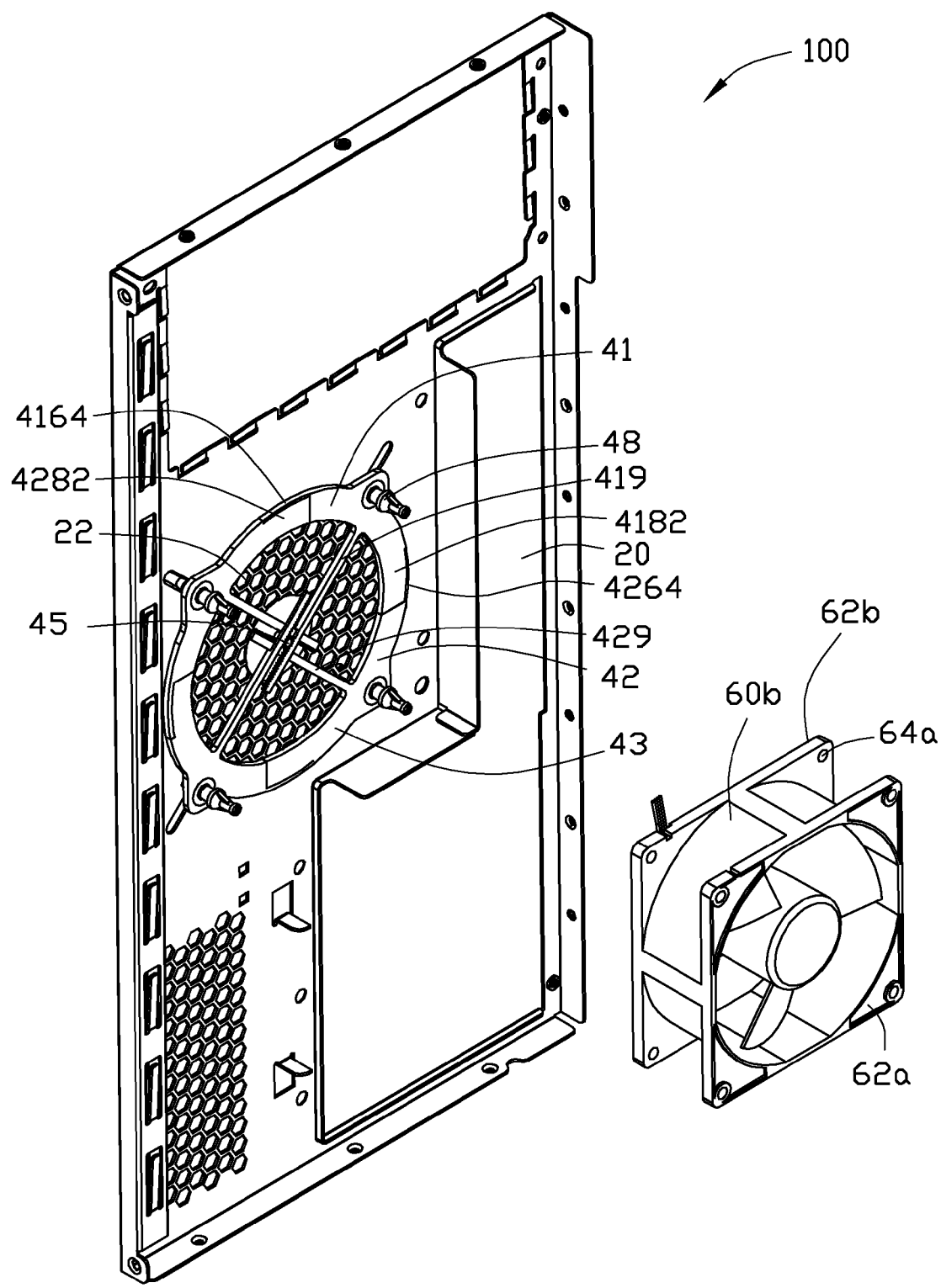
FIG. 7 is a partially assembled isometric view of the sidewall, the first position members, and the second position members of FIG. 1, together with a second fan.
Figure 8:
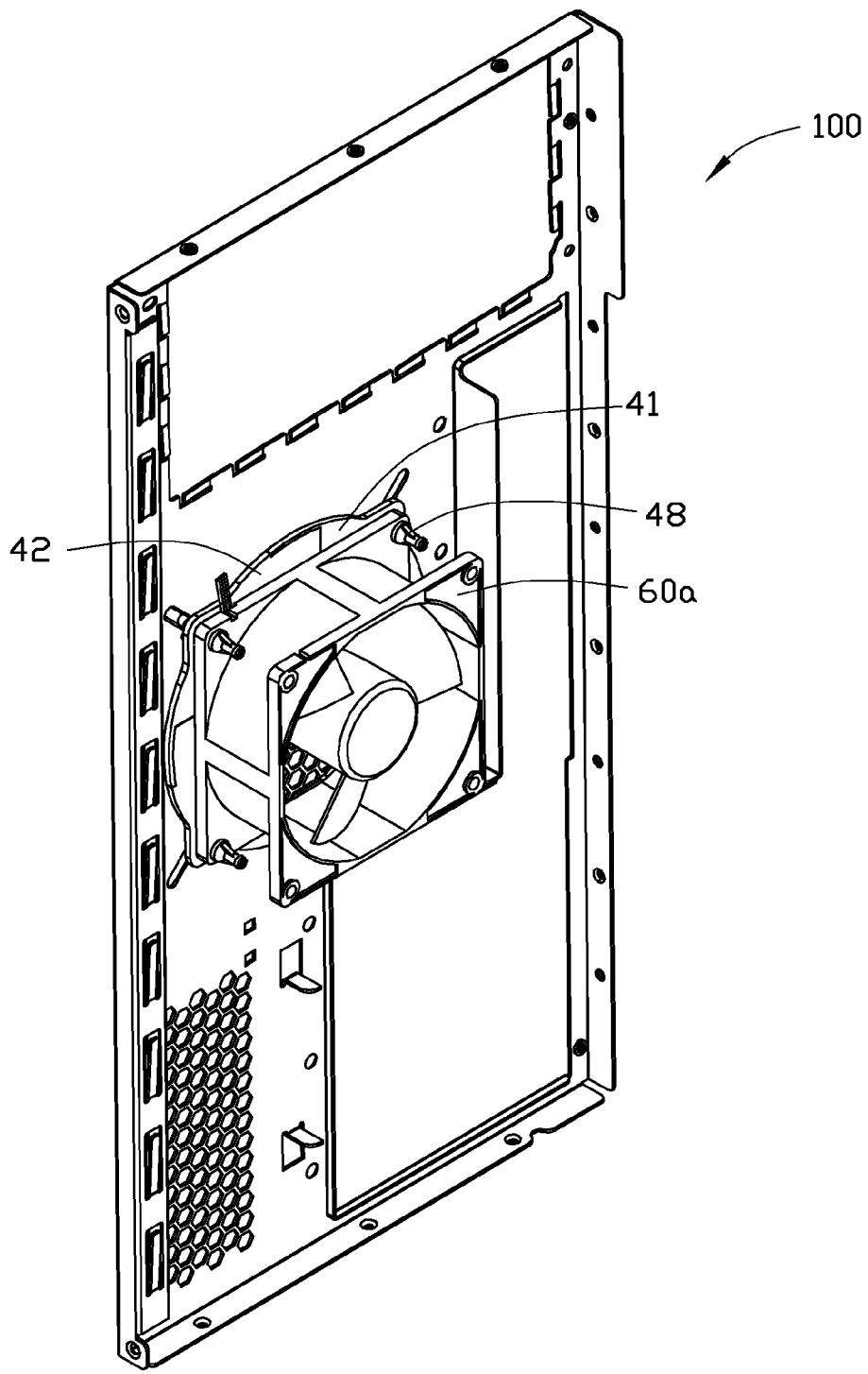
FIG. 8 is assembled, isometric view of FIG. 6.

Referring to FIG. 7 and FIG. 8, in assembly of the second fan 60b to the fan mounting apparatus 40, the operation portion 462 is rotated, to move the racks 4194 of the first position members 41 toward each other and move the racks 4294 of the second position members 42 toward each other. The fastening members 48 slide along the corresponding slide slots 24 toward the ventilation area 22, to decrease the diameter of the ring 43 for adapting the second fan 60b. Therefore, the second fan 60b can be assembled like the first fan 60a.

Even though numerous characteristics and advantages of the embodiments have been set forth in the foregoing description, together with details of the structure and function of the embodiments, the present disclosure is illustrative only, and changes may be made in detail, especially in the matters of shape, size, and arrangement of parts within the principles of the embodiments to the full extent indicated by the broad general meaning of the terms in which the appended claims are expressed.

What is claimed is:

1. A fan mounting apparatus, comprising:
two opposite first position members each comprising a first position plate, mounted to a sidewall and around a ventilation area, and a first rack extending in from the first position plate;
two opposite second position members each comprising a second position plate, mounted to the sidewall and around the ventilation area and a second rack, extending in from the second position plate, wherein the first position plates and the second position plates are arranged to form a ring member around the ventilation area; and
an operation member comprising a gear;
wherein distal ends of the first and second racks cooperatively define a receiving space, the gear is received in the receiving space and meshes with the first and second racks, the first and second position plates are radially slidable about a center of the ventilation area in response to rotating the gear, thereby decreasing or increasing a diameter of the ring member, for selectively mounting the different sized fans.

2. The fan mounting apparatus of claim 1, wherein the first and second position plates are arc-shaped and slidably connected end to end, the first rack of each first position member extends from a concave side of the first position plate, and the second rack of each second position member extends from a concave side of the second position plate.

3. The fan mounting apparatus of claim 2, wherein a first tab extends out from a convex side of each first position plate opposite to the corresponding first rack, a second tab extends out from a convex side of each second position plate opposite to the corresponding second rack, and a fastening member extends through each of the first and second tabs and is slidably engaged in the sidewall.

4. The fan mounting apparatus of claim 2, wherein a first end of each first position plate forms a first connecting portion and a second end of the first position plate forms a second connecting portion, a first end of each second position plate forms a third connecting portion slidably connected to the second connecting portion of a corresponding one of the first position plate, and a second end of the second position plate forms a fourth connecting portion slidably connected to the first connecting portion of the other first position plate.

5. The fan mounting apparatus of claim 4, wherein each first position plate comprises a first surface and a second surface that is opposite to the first surface, the first and second surfaces are connected between the concave and convex sides of the first position plate, the first connecting portion is formed in the first surface and extends through the concave side of the first position plate, and the second connecting portion is formed in the second surface and extends through the convex side of the first position plate.

6. The fan mounting apparatus of claim 4, wherein each second position plate comprises a first surface and a second surface that is opposite to the first surface, the first and second surfaces are connected between the concave and convex sides of the second position plate, the third connecting portion is formed in the first surface and extends through the concave side of the second position plate, and the fourth connecting portion is formed in the second surface and extends through the convex side of the second position plate.

7. A computer enclosure, comprising:
a sidewall comprising a ventilation area, and defining two opposite first slide slots and two opposite second slide slots, the first and second slide slots located around the ventilation area and radially extending about a center of the ventilation area;
a fan;
a fan mounting apparatus comprising:
two opposite first position members each comprising a first position plate and a first rack extending in from the first position plate, and the first position plate slidably mounted to the sidewall by a first fastening member extending through the first position plate and slidably engaging in a corresponding first slide slot;
two opposite second position members each comprising a second position plate and a second rack extending in from the second position plate, and the second position plate slidably mounted to the sidewall by a second fastening member extending through the second position plate and slidably engaging in a corresponding second slide slot, wherein the first and second fastening members are detachably fixed in the fan; and
an operation member comprising a gear, wherein the first and second racks surround the gear and mesh with the gear, and the first and second position plates radially move about the center of the ventilation area in response to the gear being rotated.

8. The computer enclosure of claim 7, wherein the first and second position plates are arc-shaped and slidably connected end to end, the first rack of each first position member extends from a concave side of the first position plate, the second rack of each second position member extends from a concave side of the second position plate, the first and second racks cooperatively define a receiving space, the center of the ventilation area defines a rotation hole aligning with the receiving space, the gear extends through the rotation hole and is received in the receiving space.

9. The computer enclosure of claim 8, wherein a first tab extends out from a convex side of each position plate opposite to the corresponding first rack, a second tab extends out from a convex side of each position plate opposite to the corresponding second rack, and each of the first and second fastening members extends through a corresponding one of the first and second tabs and slidably engages in a corresponding one of the first and second slide slots.

10. The computer enclosure of claim 9, wherein each of the first and second tabs defines a through hole, each of the first and second fastening members comprises an abutting plate abuts an inner surface of the sidewall facing the first and second position members, a first neck portion extending from a first surface of the abutting plate and slidably received in the corresponding one of the first and second slide slots, and a second neck portion extending from a second surface of the abutting plate opposite to the first neck portion and extending through the fan.

11. The computer enclosure of claim 10, wherein each of the first and second fastening members further comprises a tapered first pin extending from the first neck portion and abutting an outer surface of the sidewall, and a tapered second pin extending from the second neck portion and abutting a surface of the fan opposite to the sidewall.

12. The computer enclosure of claim 8, wherein a first end of each first position plate forms a first connecting portion and a second end of the first position plate forms a second connecting portion, a first end of each second position plate forms a third connecting portion that is slidably connected to the second connecting portion of one of first position plate, and a second end of the second position plate forms a fourth connecting portion slidably connected to the first connecting portion of the other first position plate.

13. The computer enclosure of claim 12, wherein each first position plate comprises a first surface and a second surface that is opposite to the first surface, the first and second surfaces are connected between the concave and convex sides of the first position plate, the first connecting portion is formed in the first surface and extends through the concave side of the first position plate, and the second connecting portion is formed in the second surface and extends through the convex side of the first position plate.

14. The computer enclosure of claim 12, wherein each second position plate comprises a first surface and a second surface that is opposite to the first surface, the first and second surfaces are connected between the concave and convex sides of the second partition plate, the third connecting portion is formed in the first surface and extends through the concave side of the second position plate, and the fourth connecting portion is formed in the second surface and extends through the convex side of the second position plate.

* * * * *